US011084101B2

(12) United States Patent
Muramatsu et al.

(10) Patent No.: US 11,084,101 B2
(45) Date of Patent: Aug. 10, 2021

(54) MACHINE TOOL AND CONTROL DEVICE FOR THE MACHINE TOOL

(71) Applicant: CITIZEN WATCH CO., LTD., Tokyo (JP)

(72) Inventors: Masahiro Muramatsu, Tokyo (JP); Daisuke Sakashita, Kitasaku-gun (JP); Haruhiko Misono, Kitasaku-gun (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/472,498

(22) PCT Filed: Dec. 21, 2017

(86) PCT No.: PCT/JP2017/045855
§ 371 (c)(1),
(2) Date: Jun. 21, 2019

(87) PCT Pub. No.: WO2018/117203
PCT Pub. Date: Jun. 28, 2018

(65) Prior Publication Data
US 2020/0094327 A1 Mar. 26, 2020

(30) Foreign Application Priority Data
Dec. 22, 2016 (JP) .............................. JP2016-249806

(51) Int. Cl.
B23B 1/00 (2006.01)
B23Q 15/013 (2006.01)
G05B 19/4093 (2006.01)

(52) U.S. Cl.
CPC .............. B23B 1/00 (2013.01); B23Q 15/013 (2013.01); G05B 19/4093 (2013.01); G05B 19/40937 (2013.01)

(58) Field of Classification Search
CPC ................................ B23B 1/00; B23Q 15/013
See application file for complete search history.

(56) References Cited

U.S. PATENT DOCUMENTS 10,268,176 B2    4/2019   Sannomiya et al.
2002/0195983 A1  12/2002  Iwashita et al.
(Continued)

FOREIGN PATENT DOCUMENTS

CN   105637438 A   6/2016
CN   106232293 A   8/2016
(Continued)

Primary Examiner — Nathan L Laughlin
(74) Attorney, Agent, or Firm — Birch, Stewart, Kolasch & Birch, LLP

(57) ABSTRACT

To provide a machine tool and a control device for the machine tool that allows a user to select the vibration condition according to an input number of rotations and an input number of vibrations. The control device (184) for the machine tool (180) includes: inputting means (182) for inputting a relative number of rotations or a relative number of vibrations of the cutting tool (130) and a workpiece (W), selecting means (183c) for making it possible to select a combination of each parameter consisting of a number of rotations and a number of vibrations that are obtained on the basis of a vibration frequency dependent on a period, in which an operating instruction can be executed to the vibration means (150) and (160), and the number of rotations or the number of vibrations that is input via the inputting means (182), and setting means for setting each parameter of the number of rotations and the number of vibrations in the control section on the basis of a predetermined combination selected from combinations that are got selectable by the selecting means (183).

15 Claims, 13 Drawing Sheets

(56) References Cited

U.S. PATENT DOCUMENTS

| | | | |
|---|---|---|---|
| 2007/0051701 A1 | 3/2007 | Ogata et al. | |
| 2009/0107308 A1 | 4/2009 | Woody et al. | |
| 2016/0231730 A1 | 8/2016 | Wakana | |
| 2017/0003674 A1* | 1/2017 | Tezuka | G05B 19/4086 |
| 2017/0102685 A1 | 4/2017 | Kitakaze et al. | |
| 2017/0108846 A1* | 4/2017 | Sannomiya | B23Q 15/0075 |
| 2017/0304920 A1* | 10/2017 | Sannomiya | B23Q 15/12 |
| 2017/0322538 A1 | 11/2017 | Watanabe et al. | |
| 2018/0203510 A1* | 7/2018 | Yamano | A63F 13/213 |
| 2018/0257192 A1* | 9/2018 | Nakaya | G05B 19/4093 |

FOREIGN PATENT DOCUMENTS

| | | | |
|---|---|---|---|
| JP | 2001-150201 A | 6/2001 | |
| JP | 2002-103101 A | 4/2002 | |
| JP | 2003-58218 A | 2/2003 | |
| JP | 2007-69330 A | 3/2007 | |
| KR | 10-2016-0095477 A | 8/2016 | |
| WO | WO 2015/146945 A1 | 10/2015 | |
| WO | WO 2015/146946 A1 | 10/2015 | |
| WO | WO-2015146945 A1 * | 10/2015 | G05B 19/19 |
| WO | WO 2016/035868 A1 | 3/2016 | |
| WO | WO 2016/084171 A1 | 6/2016 | |

* cited by examiner

FIG.6

| VIBRATION FREQUENCY f(Hz) | NUMBER OF VIBRATIONS N (times/r) | | | |
|---|---|---|---|---|
| | 1.5 | 2.5 | 3.5 | 4.5 |
| 100.0 | 4000 | 2400 | 1714 | 1333 |
| 83.3 | 3333 | 2000 | 1429 | 1111 |
| 71.4 | 2857 | 1714 | 1224 | 952 |
| 62.5 | 2500 | 1500 | 1071 | 833 |
| 55.6 | 2222 | 1333 | 952 | 741 |
| 50.0 | 2000 | 1200 | 857 | 667 |
| 45.5 | 1818 | 1091 | 779 | 606 |
| 41.7 | 1667 | 1000 | 714 | 556 |
| 38.5 | 1538 | 923 | 659 | 513 |
| 35.7 | 1429 | 857 | 612 | 476 |
| 33.3 | 1333 | 800 | 571 | 444 |
| 31.3 | 1250 | 750 | 536 | 417 |
| 29.4 | 1176 | 706 | 504 | 392 |
| 27.8 | 1111 | 667 | 476 | 370 |
| 26.3 | 1053 | 632 | 451 | 351 |
| 25.0 | 1000 | 600 | 429 | 333 |

FIG.8

| VIBRATION FREQUENCY f(Hz) | NUMBER OF VIBRATIONS AT NUMBER OF ROTATIONS S =1500 | DIFFERENCE FROM NUMBER OF VIBRATIONS (INTEGER+0.5) |
|---|---|---|
| 100.0 | 4.00 | 0.50 |
| 83.3 | 3.33 | 0.17 |
| 71.4 | 2.86 | 0.36 |
| 62.5 | 2.50 | 0.00 |
| 55.6 | 2.22 | 0.28 |
| 50.0 | 2.00 | 0.50 |
| 45.5 | 1.82 | 0.32 |
| 41.7 | 1.67 | 0.17 |
| 38.5 | 1.54 | 0.04 |
| 35.7 | 1.43 | 0.07 |
| 33.3 | 1.33 | 0.17 |
| 31.3 | 1.25 | 0.25 |
| 29.4 | 1.18 | 0.32 |
| 27.8 | 1.11 | 0.39 |
| 26.3 | 1.05 | 0.45 |
| 25.0 | 1.00 | 0.50 |

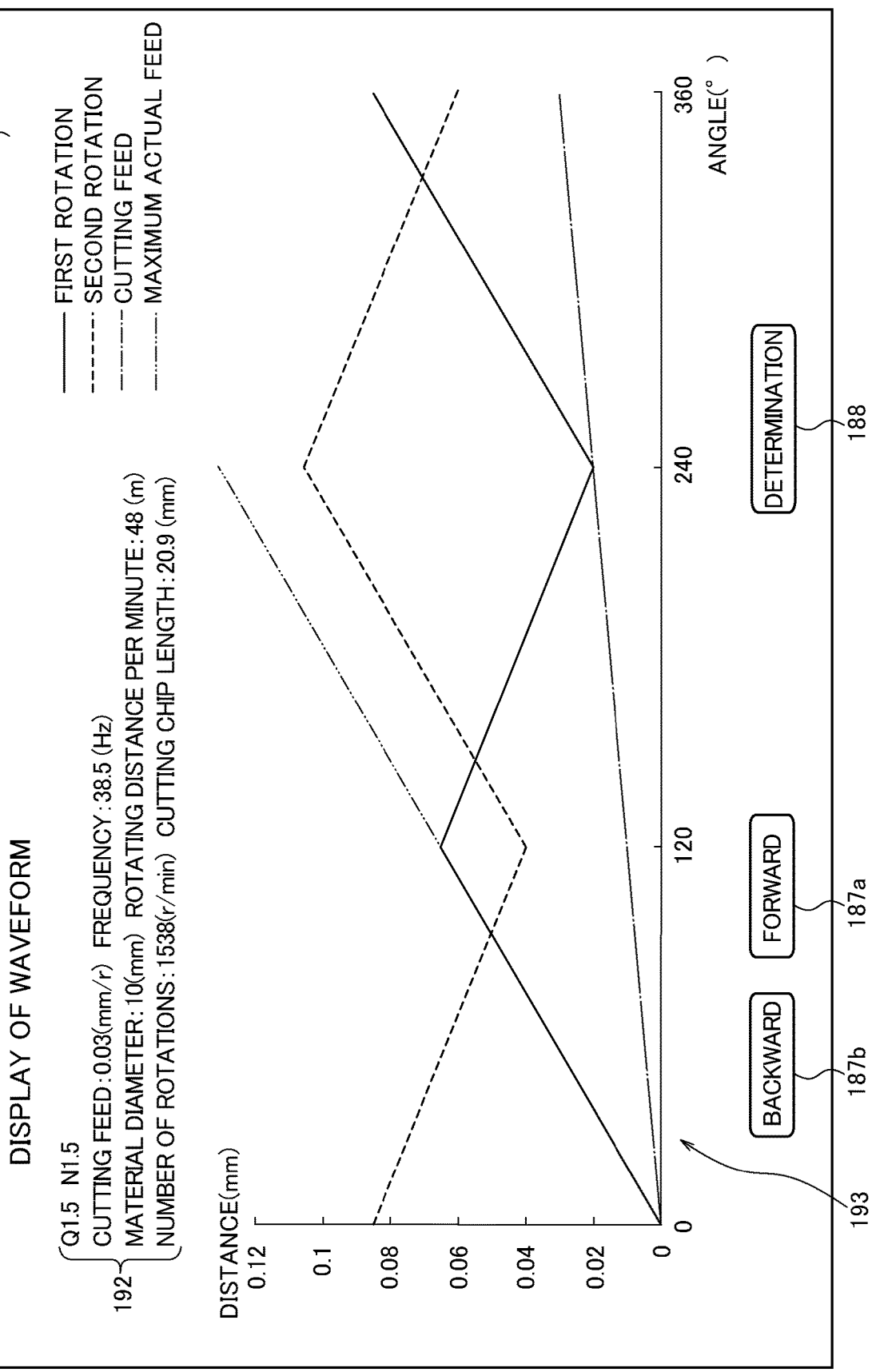

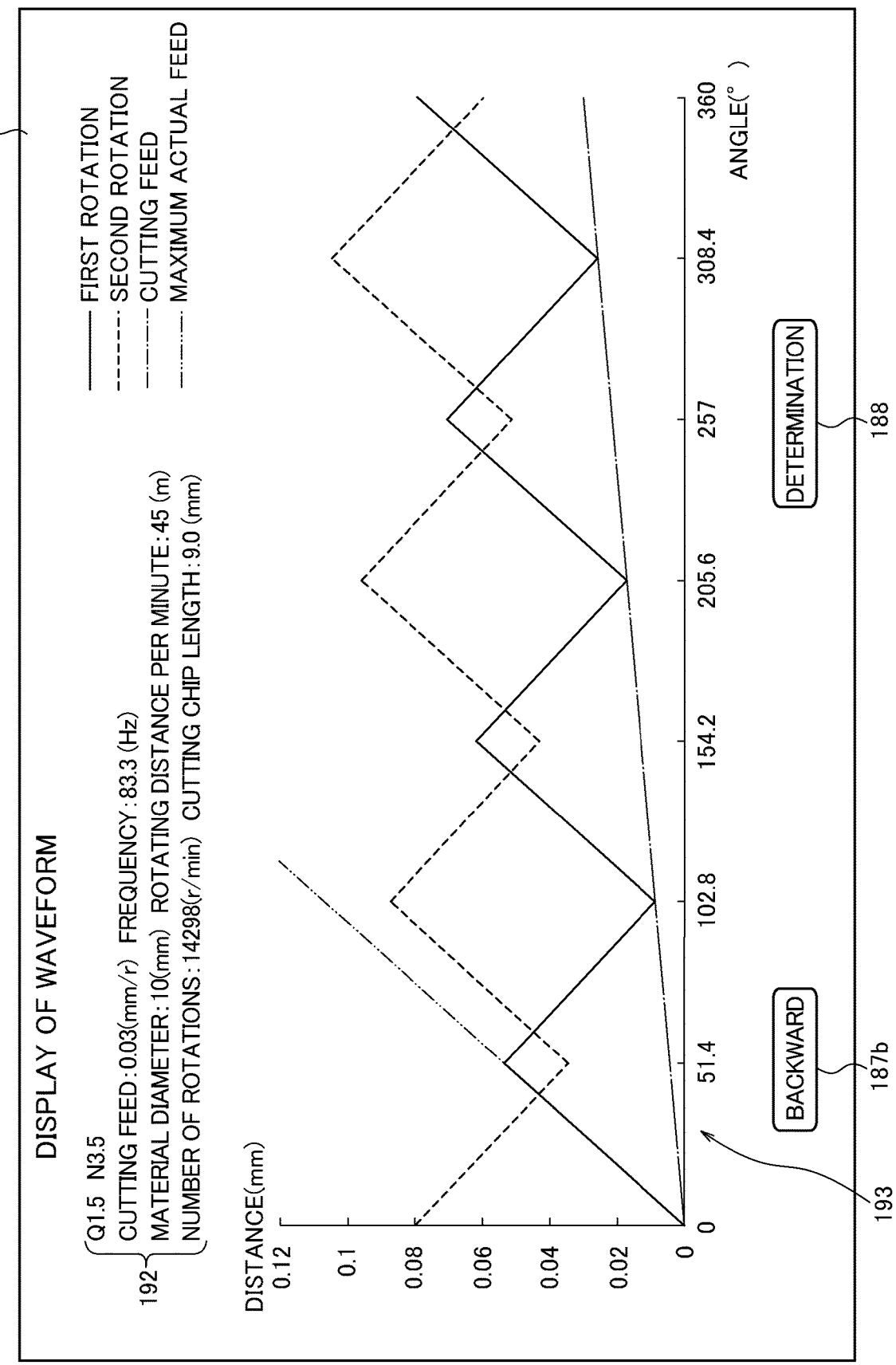

MACHINE TOOL AND CONTROL DEVICE FOR THE MACHINE TOOL

TECHNICAL FIELD

The present invention relates to a machine tool and its control device.

BACKGROUND ART

A conventionally known machine tool includes a cutting tool for cutting a workpiece, rotating means for relatively rotating the cutting tool and the workpiece at a predetermined number of rotations, and vibration means for reciprocally vibrating the cutting tool and the workpiece with respect to each other. The machine tool cuts the workpiece while feeding the cutting tool and the workpiece in the predetermined feed direction with vibration. The number of that vibrations per relative rotation depends on the vibration frequency of the vibration means. (see, for example, Patent Literature 1).

In addition, it is known that the vibration frequency of the vibration means is determined on the basis of a period, in which a control device of the machine tool can execute an operating instruction, and the vibration condition input by the user is automatically corrected to the vibration condition that the control device can use (see, for example, Patent Document 2).

CITATION LIST

Patent Literature

[Patent Literature 1] Japanese Patent Laid-Open No. 2001-150201 (see particularly Claim 1 and FIG. 1)
[Patent Literature 2] International Publication WO No. 2015/146946 (see particularly Claim 1 and FIG. 6)

SUMMARY OF INVENTION

Technical Problem

Since the vibration frequency of the vibration means is determined on the basis of a period in which the control device of the machine tool can execute an operating instruction, it has not been easy to perform machining according to the vibration conditions selectable by the machine tool.

The present invention solves the problems of the prior art as described above, and provides a machine tool and its control device for allowing users to select vibration conditions according to the input number of rotations or the input number of vibrations.

Solution to Problem

To solve the above-mentioned problem, the first characteristic of the present invention is a control device for a machine tool provided in the machine tool comprising a cutting tool for cutting a workpiece, rotating means for relatively rotating the cutting tool and a workpiece, feeding means for feeding the cutting tool and a workpiece in a predetermined feed direction, and vibration means for reciprocally vibrating the cutting tool and a workpiece in a relative manner, wherein the control device comprises; a control section for making the machine tool perform vibration cutting to a workpiece via the relative rotation of the cutting tool and a workpiece and via feeding of a cutting tool to the workpiece with reciprocal vibrations, inputting means for inputting a relative number of rotations or a relative number of vibrations of the cutting tool and a workpiece, selecting means for making it possible to select a combination of each parameter consisting of a number of rotations and a number of vibrations that are obtained on the basis of a vibration frequency dependent on a period, in which an operating instruction can be executed to the vibration means, and the number of rotations or the number of vibrations that is input via the inputting means, and setting means for setting each parameter of the number of rotations and the number of vibrations in the control section on the basis of a predetermined combination selected from combinations that are got selectable by the selecting means.

Secondly, the characteristic is that the selecting means selectably displays a combination of each parameter consisting of the obtained number of rotations and the obtained number of vibrations.

Thirdly, the characteristic is that a combination of the each parameter and a graph that graphically shows a vibration operation corresponding to a combination of the each parameter are displayed.

Fourthly, the characteristic is that the control section has a combination table including a plurality of combinations based on the vibration frequency, and the selecting means makes it possible to select a combination from the combination table that has a small difference from a value input via the inputting means.

Fifthly, the characteristic is that the control section has an addition means for newly extracting a combination different from combinations that are got selectable by the selecting means, and the selecting means makes it possible to select a different combination extracted by the addition means.

Sixthly, the characteristic is that the machine tool comprises the control device described above.

Advantageous Effects of Invention

According to the control device of the machine tool configured as described above, since the combination of the vibration conditions that can be set to the machine tool is selectable, the user can easily select the desired vibration conditions and allow the machine tool to perform vibration cutting.

If a graph that graphically reflects the vibration operation, which corresponds to the combination of each parameter, is displayed, the user can easily confirm the vibration operation in cutting operation in relation to the user's inputs to the inputting means. For example, the range of air-cut, which is the motion in which the cutting tool does not cut the workpiece, can be easily checked.

The control section has an addition means for newly extracting a combination different from combinations that are got selectable by the selecting means, and the selecting means makes it possible to select a different combination extracted by the addition means. Thus, a combination of each parameter can be easily changed according to the workpiece to be cut.

Even if a desired vibration condition doesn't exist in the selectable vibration conditions, a new vibration condition can be added, so that more desirable vibration conditions can be selected as a vibration condition to be selected.

In addition, the machine tool with an effect created by the above-mentioned control device can be provided.

BRIEF DESCRIPTION OF DRAWINGS

FIG. 6 is a combination table of vibration conditions in the first embodiment of the present invention.

FIG. 8 is a combination table of vibration conditions in the second embodiment of the present invention.

FIG. 13 is a diagram of a display for displaying an extracted combination.

FIG. 14 is a diagram of a display for displaying an extracted combination.

DESCRIPTION OF EMBODIMENTS

First Embodiment

The entire configuration of a machine tool 100 according to a first embodiment of the present invention will be described below.

Figure 1:
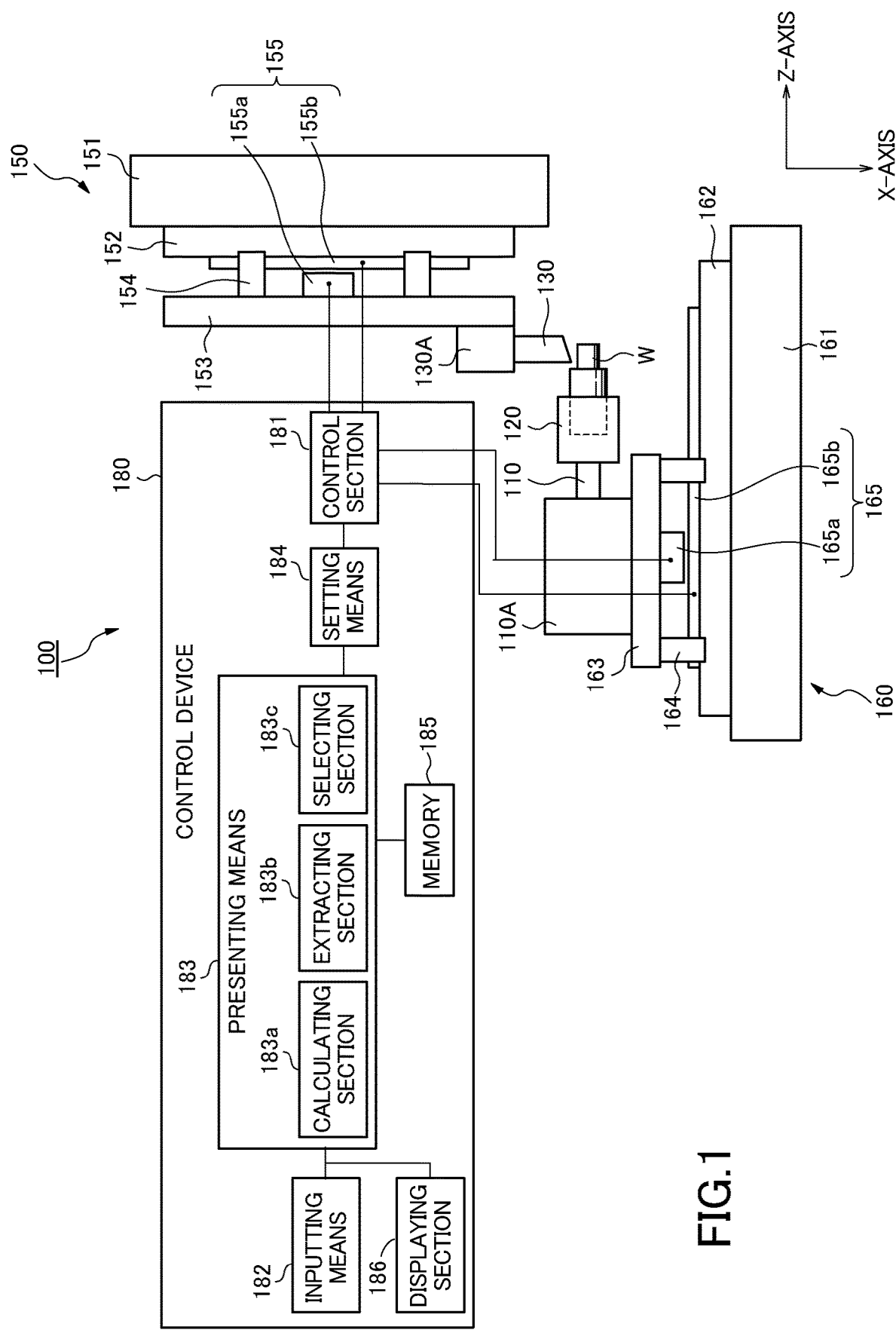
FIG. 1 is a diagram schematically illustrating a machine tool of a first embodiment of the present invention.

As shown in FIG. 1, the machine tool 100 according to the present invention includes a spindle 110, a cutting tool post 130A, and a control device 180.

A chuck 120 is provided at a tip of the spindle 110.

The spindle 110 is a workpiece holding means, and a workpiece W is held by the spindle 110 via the chuck 120.

The spindle 110 is rotatably supported by the spindle headstock 110A and rotationally driven by the power of a spindle motor.

The spindle motor can be, for example, a known built-in motor provided between the spindle headstock 110A and the spindle 110.

A bed of the machine tool 100 is provided with a Z-axis direction feeding mechanism 160.

The Z-axis direction feeding mechanism 160 includes a base 161, which is integral with the bed, and a Z-axis direction guide rail 162 fixed to the base 161.

The Z-axis direction guide rail 162 slidably supports a Z-axis direction feeding table 163 via a Z-axis direction guide 164.

The spindle headstock 110A is mounted on the Z-axis direction feeding table 163.

The spindle headstock 110A is arranged so that the axial direction of the spindle 110 coincides with the extending direction of the Z-axis direction guide rail 162.

The spindle headstock 110A is provided so that it can be moved in the axial direction (the Z-axis direction in drawings) of the spindle 110 by the Z-axis direction feeding mechanism 160, and the spindle 110 can be moved along the Z-axis direction via the spindle headstock 110A.

A mover 165a of a linear servo motor 165 is provided on the Z-axis direction feeding table 163.

A stator 165b of the linear servo motor 165 is provided on the base 161.

When the Z-axis direction feeding table 163 is moved in the Z-axis direction by the linear servo motor 165, the spindle headstock 110A moves in the Z-axis direction, and the spindle 110 moves along the Z-axis direction.

On the bed side of the machine tool 100, an X-axis direction feeding mechanism 150 is provided.

The X-axis direction feeding mechanism 150 includes a base 151 integral with the bed side, and an X-axis direction guide rail 152 extending in the X-axis direction, which is orthogonal to the Z-axis direction in the vertical direction.

The X-axis direction guide rail 152 is fixed to the base 151, and an X-axis direction feeding table 153 is slidably supported by the X-axis direction guide rail 152 via an X-axis direction guide 154.

The cutting tool post 130A is mounted on the X-axis direction feeding table 153.

The cutting tool post 130A is provided movably in the X-axis direction by the X-axis direction feeding mechanism 150.

A cutting tool 130, such as a tool bit for cutting the workpiece W, is attached to the cutting tool post 130A. Thus, the cutting tool post 130A configures a tool post for holding the cutting tool 130.

A mover 155a of a linear servo motor 155 is provided on the X-axis direction feeding table 153.

A stator 155b of the linear servo motor 155 is provided on the base 151.

When the X-axis direction feeding table 153 is moved in the X-axis direction by the linear servo motor 155, the cutting tool post 130A moves in the X-axis direction, and the cutting tool 130 moves along the X-axis direction.

Although not shown, a Y-axis direction feeding mechanism may be provided for feeding in the Y-axis direction, orthogonal to the Z-axis direction and X-axis direction shown in the figure.

The Y-axis direction feeding mechanism may have the same structure as the X-axis direction feeding mechanism 150.

By mounting the X-axis direction feeding mechanism 150 on the bed via the Y-axis direction feeding mechanism, a Y-axis direction feeding table is moved in the Y-axis direction by the linear servo motor, and the cutting tool post 130A is moved in the Y-axis direction, and the cutting tool 130 can be moved in the X-axis direction and the Y-axis direction.

The Y-axis direction feeding mechanism may be provided on the bed side via the X axis direction feeding mechanism 150, and the cutting tool post 130A may be mounted on the Y-axis direction feeding table.

The control device 180 controls rotation of the spindle 110 and movement of the X-axis direction feeding mechanism 150, the Z-axis direction feeding mechanism 160 and the like.

Figure 2:
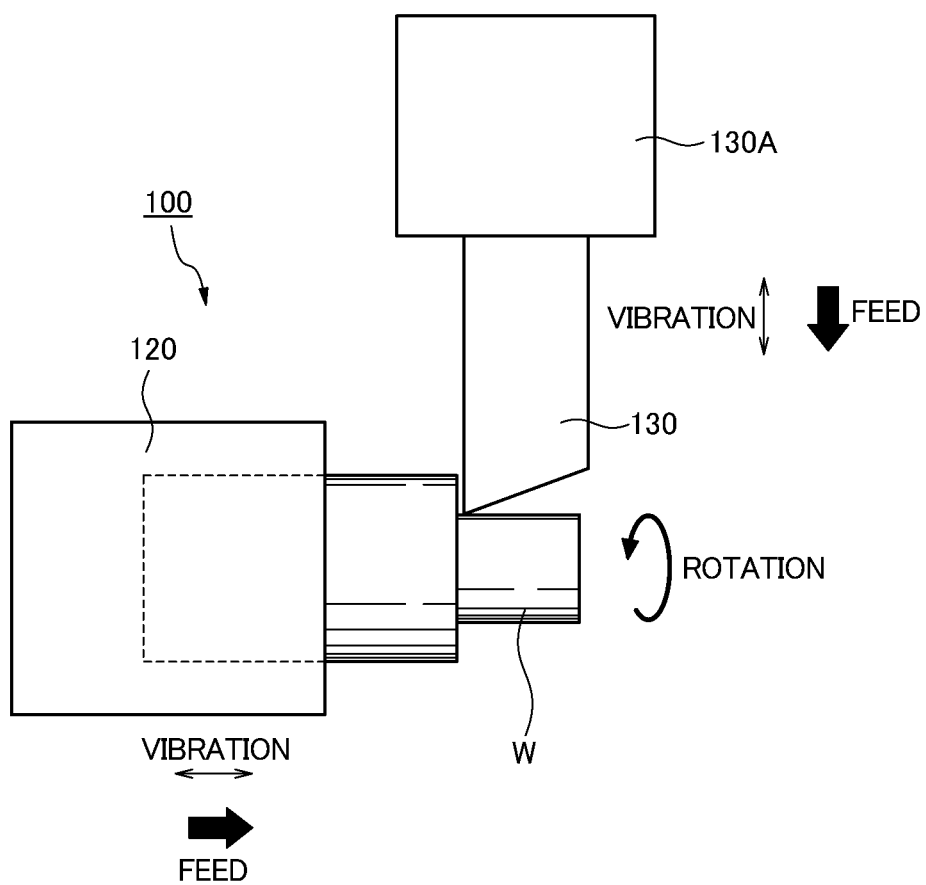
FIG. 2 is a schematic diagram illustrating the relation between a cutting tool and a workpiece.

The X-axis direction feeding mechanism 150 and the Z-axis direction feeding mechanism 160 or those feeding mechanisms including the Y-axis direction feeding mechanism constitute feeding means. Cooperative operation of the Z-axis direction feeding mechanism 160 with the X-axis direction feeding mechanism 150 or the Y-axis direction feeding mechanism can move the spindle headstock 110A and the cutting tool post 130A to a predetermined position as shown in FIG. 2.

By moving the spindle headstock 110A and the cutting tool post 130A to a predetermined position, the cutting tool 130 is moved relative to the spindle 110. And, by driving the spindle 110 as rotating means for relatively rotating the workpiece W and the cutting tool 130, the workpiece W is rotated relative to the cutting tool 130 so that the workpiece W can be cut into a desired shape.

In the first embodiment, the configuration in which both the spindle headstock 110A and the cutting tool post 130A can move is described. However, the configuration may be such that the spindle headstock 110A is fixed to the bed, and the cutting tool post 130A can move in the X-axis direction, the Y-axis direction, and the Z-axis direction.

In this case, the feeding means is constituted by a feeding mechanism for moving the cutting tool post 130A.

Alternatively, the cutting tool post 130A may be fixed to the bed, and the spindle headstock 110A may be movable in the X-axis direction, the Y-axis direction, and the Z-axis direction.

In this case, the feeding means is constituted by a feeding mechanism provided in the bed.

In the first embodiment, an example, in which linear servo motors are used as the X-axis direction feeding mechanism 150 and the Z-axis direction feeding mechanism 160, has been described. However, known ball screws and servo motors may be used.

In the first embodiment, an example, in which the workpiece W is rotated with respect to the cutting tool 130, has been described, but the cutting tool 130 may be rotated with respect to the workpiece W by using a rotating tool such as a drill as the cutting tool.

In this case, a motor for rotating the cutting tool 130 corresponds to the rotating means of the present invention.

Figure 3:
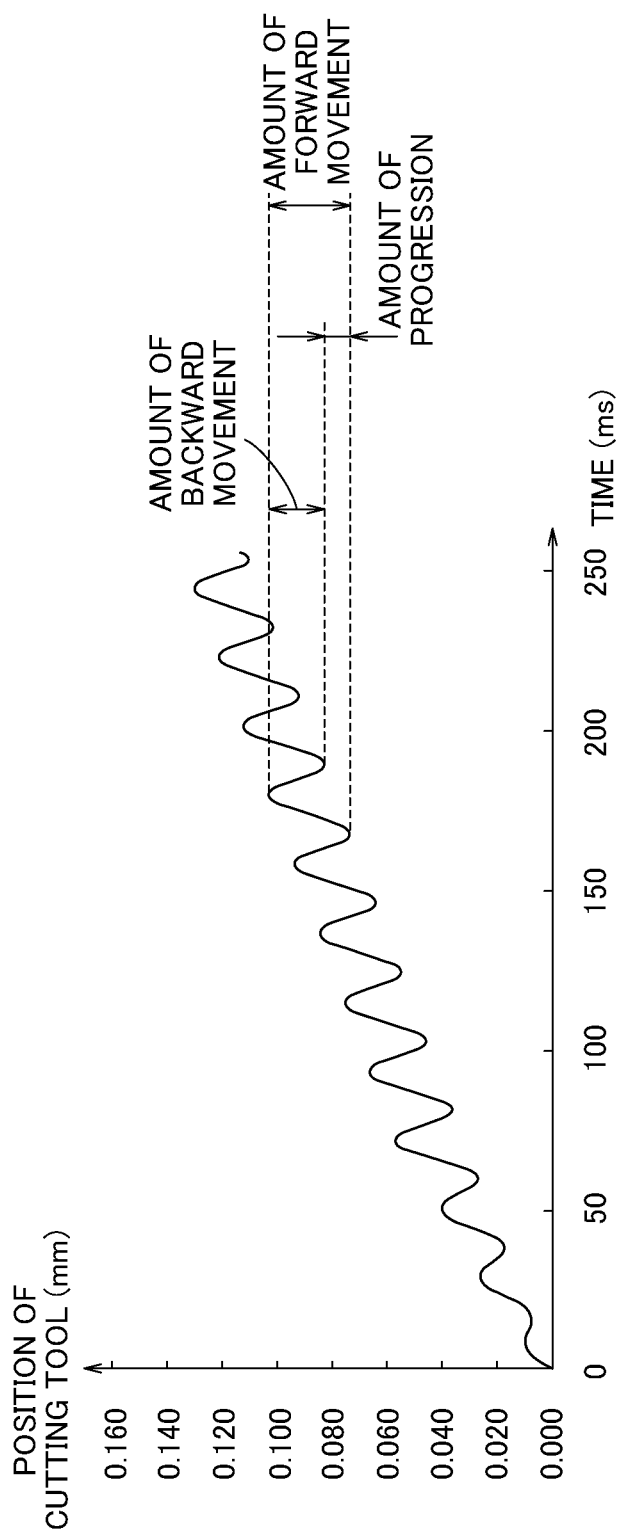
FIG. 3 is a diagram illustrating reciprocal vibration and a position of the cutting tool.

As shown in FIG. 3, the control section 181 of the control device 180 moves the spindle headstock 110A forward (this movement is referred to as forward movement) by a predetermined amount of the forward movement, and then moves backward (which is referred to as backward movement) by a predetermined amount of the backward movement. The cutting tool 130 can be fed with respect to the workpiece W in the feed direction by a difference (an amount of progression) between the amount of the forward movement and the amount of the backward movement with vibration along the feed direction.

The vibration means is constituted by the X axis direction feeding mechanism 150 and the Z-axis direction feeding mechanism 160 or those feeding mechanisms including the Y-axis direction feeding mechanism. By moving the spindle headstock 110A and the cutting tool post 130A forward and backward, the cutting tool 130 can be vibrated with respect to the workpiece W.

By the feeding means, which also serves as the vibration means, the cutting tool 130 is fed with respect to the workpiece W with vibration along the feed direction to cut the workpiece W by an amount of feed. This amount of feed is the total amount of progression while the spindle rotates one rotation, or while a phase of the spindle changes from 0 to 360 degrees.

Figure 4:
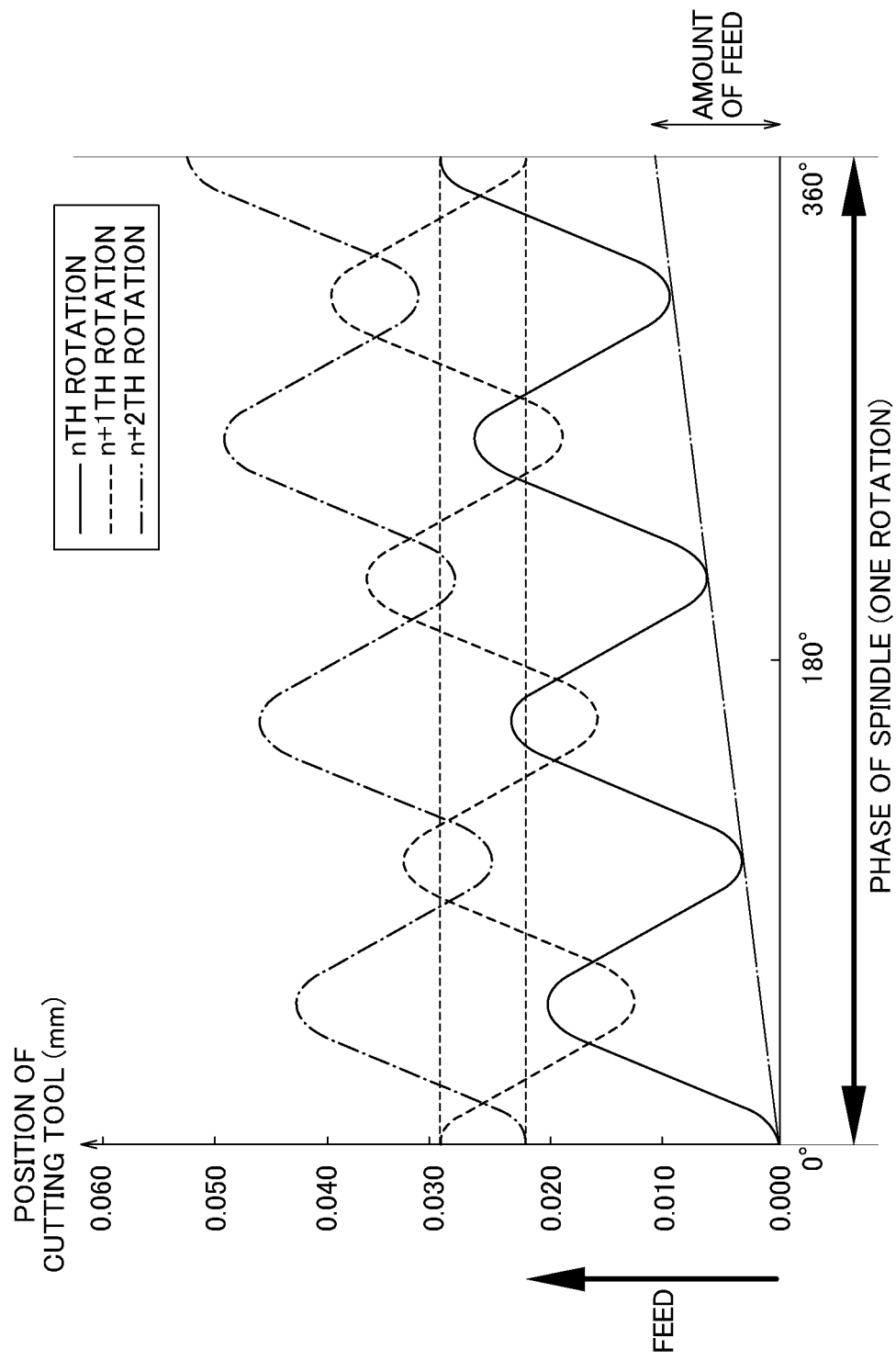
FIG. 4 is a diagram illustrating the relation between routes of the cutting edge in the nth rotation, the n+1th rotation, and the n+2th rotation of a spindle.

When cutting the workpiece W into a predetermined shape with the cutting tool 130, the peripheral surface of the workpiece is cut into a sinusoidally curved shape with the cutting tool 130 as shown in FIG. 4.

FIG. 4 shows an example in which the number of vibrations N of the spindle headstock 110A per rotation of the spindle 110 is 3.5 (N=3.5). A virtual line (indicated with a one-dot chain line) passing through the valley of the waveform is a straight line of feed, and the position of the phase of 360° of the spindle in this straight feeding line corresponds to the amount of feed per rotation of the workpiece W.

In FIG. 4, for easy understanding of the condition of the peripheral surface of the workpiece, the vertical axis of the graph represents the position of the cutting tool 130 with respect to the workpiece W in the feed direction, and the horizontal axis of the graph represents a rotation of the workpiece W or the phase from 0° to 360° of the spindle. Thus, the graph represents a cutting trajectory on the peripheral surface of the workpiece in an extended form along the peripheral direction of the workpiece in cutting the peripheral surface of the workpiece with the cutting tool 130.

A cutting trajectory (shown by a solid line in FIG. 4) on the peripheral surface of the workpiece that is cut with the cutting tool 130 at the nth (n is an integer of 1 or more) rotation of the spindle 110 is shifted from a cutting trajectory on the peripheral surface of the workpiece at the n+1th rotation of the spindle 110 in a direction indicating the phase of the spindle (the horizontal axis direction of the graph in FIG. 4)

Specifically, the position of the shallowest point in the valley in the phase of the shape of the peripheral surface of the workpiece, which is shown by the broken line in FIG. 4, is shifted from the position of the shallowest point in the valley in the phase of the shape of the peripheral surface of the workpiece, which is shown by the solid line in FIG. 4 in a direction indicating the phase of the spindle (the horizontal axis direction of the graph). The shallowest points in the valley in the phase of the shape of the peripheral surface of the workpiece are, in other words, the peak points in the mountain viewed from the cutting tool 130.

Since the vibration cutting has a phase and an amplitude, which make the cutting trajectories in forward and backward movements of reciprocal vibration intersect each other, a portion of the workpiece W that is cut with the cutting tool 130 in forward movement of the reciprocal vibration partially overlaps a portion of the workpiece W that is cut with the cutting tool 130 in backward movement of the reciprocal vibration. Thus, the portion of the peripheral surface of the workpiece W that is cut with the cutting tool 130 in the n+1th rotation of the workpiece W includes a portion of the peripheral surface of the workpiece W that has been cut in the nth rotation of the workpiece W. When the cutting tool 130 passes through that overlapping portion, the cutting tool 130 performs "air-cut", in which the cutting tool 130 does not cut any part of the workpiece W in the feed direction during vibration cutting.

Due to the air-cut, chips generated during vibration cutting work of the workpiece W are sequentially segmented.

As a result, the machine tool 100 can cut the workpiece W smoothly while segmenting chips by the reciprocal vibration of the cutting tool 130 along the feed direction.

However, if the amount of feed is increased with the size of the amplitude kept constant, the period in which a portion of the peripheral surface of the workpiece that is cut in the n+1th rotation of the workpiece is included in a portion that is cut in the nth rotation decreases. And if the portion that is cut in the n+1th rotation does not reach the portion that is cut in the nth rotation, the air-cut motion does not occur.

The period in which a portion that is cut in the n+1th rotation is included in a portion that is cut in the nth rotation changes according to the feed amount and the amplitude of the vibration waveform. Thus, the amplitude of the vibration waveform is set to be proportional to the feed amount so that the air-cut motion occurs. Specifically, the amplitude is set by multiplying the feed amount by the amplitude feed ratio Q, which is the ratio of the amplitude to the feed amount.

FIG. 4 shows an example in which portions that are cut in the forward movement and portions that are cut in the next backward movement partially overlap in the shallowest points in the valleys of the phase.

However for example, if the portion of the peripheral surface of the workpiece that is cut in the n+1th rotation of the spindle 110 includes a portion of the peripheral surface of the workpiece that is cut in the nth rotation of the spindle 110, the air-cut of the cutting tool 130 occurs.

In other words, the cutting trajectory of the cutting tool 130 in backward movement in the n+1th rotation (n is an integer of 1 or more) of the peripheral surface of the workpiece only need to reach the cutting trajectory of the cutting tool 130 in the nth rotation of the peripheral surface of the workpiece.

The portion of the peripheral surface of the workpiece that is cut in the n+1th rotation of the spindle 110 and the portion of the peripheral surface of the workpiece that is cut in the nth rotation of the spindle 110 may be brought adjacent to each other so that the cutting chips can be folded and segmented at the adjacent portion.

As shown in FIG. 4, it is only needed that the shape phases in the workpiece W to be cut with the cutting tool 130 in the n+1th rotation and in the nth rotation do not coincide with each other. Thus, those phase shapes do not need to be reversed by 180°.

For example, the number of vibrations N, which is the number of times the workpiece W and the cutting tool 130 are relatively and reciprocally vibrated during one rotation of the spindle 110, can be set as 1.1, 1.25, 2.6, 3.75 (times/r) or the like, for example.

Also, the number of vibrations N can be set to a value smaller than 1 (0<the number of vibrations N<1.0).

In a case where the number of vibrations N is set to a value smaller than 1 (times/r), the spindle 110 rotates more than one rotation before the cutting tool post 130A makes one reciprocation.

In the machine tool 100, a control section 181 of the control device 180 issues an operating instruction at a predetermined instruction period.

By this operating instruction, the reciprocal vibration of the spindle headstock 110A (spindle 110) or the cutting tool post 130A (cutting tool 130) can be operated at a predetermined vibration frequency f based on the instruction period of the control section 181.

For example, in the case of the machine tool 100 that can issue 500 operating instructions per second by the control section 181, the instruction period of the control section 181 has a reference period of 1 (second)/500 (times)=2 (ms/times).

The instruction period is determined on the basis of the reference period, and in general, the instruction period is a value that is an integral multiple of the reference period.

For example, assuming that the instruction period is 10 (ms), which is five times as long as the reference period (2 (ms)), forward and backward movements can be performed every 10 (ms). Thus, the spindle headstock 110A (spindle 110) or the cutting tool post 130A (cutting tool 130) can reciprocally vibrate in a frequency of 1/(0.002×5)=100.0 (Hz).

In addition, the spindle headstock 110A (spindle 110) or the cutting tool post 130A (cutting tool 130) can reciprocally vibrate only at a plurality of predetermined limited frequencies that are inverse numbers of integral multiples of the reference period.

Now, a group of vibration frequencies f corresponding to the instruction period is referred to as a vibration frequency group f. Then, the vibration frequency of the spindle headstock 110A or the cutting tool post 130A is set to a value selected from the vibration frequency group f.

Further, in some cases, the control device 180 (the control section 181) may be able to set the instruction period at a multiple, which is not an integer multiple, of the reference period (2 (ms)).

When the spindle headstock 110A (spindle 110) or the cutting tool post 130A (cutting tool 130) reciprocally vibrates, and the number of rotations of the spindle 110 is set to S, the number of vibrations N is determined by the following equation.

$$N = f \times 60/S$$

The number of vibrations N is proportional to the vibration frequency f and inversely proportional to the number of rotations S.

The spindle 110 rotates faster as the vibration frequency f becomes higher or the number of vibrations N becomes smaller.

Next, a specific configuration of the control device 180 in the machine tool 100 of the first embodiment will be described as follows.

The control device 180 according to the present embodiment includes inputting means 182 for allowing the user to input a desired number of rotations or a desired number of vibrations, presenting means 183 for extracting vibration conditions according to the input number of rotations or the input number of vibrations and selectably presenting the vibration conditions to the user, and setting means 184 for setting the selected vibration condition in the control section 181.

The inputting means 182 includes an input device such as a keyboard or a touch panel linked to the presenting means 183, and by the inputting operation of the user, the number of rotations or the number of vibrations can be input to the presenting means 183.

The presenting means 183 includes a calculating section 183a, an extracting section 183b, and selecting section 183c. On the basis of a vibration frequency f and the input number of rotations or the input number of vibrations, the calculating section 183a calculates in accordance with the vibration frequency the number of rotations and the number of vibrations close to the input number of rotations or the input number of vibrations. That vibration frequency f depends on a period in which an operating instruction can be executed to the vibration means. The extracting section 183b extracts candidates of the combination of each parameter consisting of the number of rotations and the number of vibrations that are calculated by the calculating section 183a. The selecting section 183c selectably presents the candidates of the combination of each parameter extracted by the extracting section 183b to the user. The selecting section 183c corresponds to the selecting means of the present invention.

For example, a memory 185, which stores a combination table in advance showing the relationship of the numbers of rotations S (or the numbers of vibrations N) with each vibration frequency f of the vibration frequency group f and any number of vibrations N (or number of rotations S) is provided in the control device 180. The presenting means 183 can extract combination candidates of each parameter to be extracted by the extracting section 183b from the combination table, which is stored in the memory 185, in order of approximation to the input value of the number of rotation or the number of vibrations.

The combination table may limit the numbers of vibrations N that are set in the control section 181 to a plurality of predetermined values, and limit the number of combinations of each predetermined vibration frequency f and the number of rotations S, which is calculated from the plurality of the limited number of vibrations N. A plurality of combination candidates of each parameter may be selected, and only one candidate may be selected.

A displaying section 186, which includes a display or the like, is linked to the presenting means 183, and the combination candidates extracted by the presenting means 183 are configured to be displayed on the displaying section 186.

The setting means 184 includes, for example, a touch panel of a display. The user selects a desired combination by touching a combination candidate displayed in the displaying section 186, and the selected combination can be set in the control section 181 as parameters of vibration conditions including the vibration frequency f.

The control section 181 controls the spindle 110, the vibration means, and the feeding means on the basis of the vibration condition set by the setting means 184, and makes the machine tool 100 perform the vibration cutting of the workpiece W.

The user can easily recognize the vibration conditions selectable for the machine tool 100, and can easily make the machine tool 100 machine according to the vibration conditions that the user recognizes and selects.

In addition to using the input device such as a keyboard and a touch panel as in the present invention, the user inputs a desired number of rotations or a desired number of vibrations, for example, by writing the number of rotations S and the number of vibrations N in a machining program or by setting the number of vibrations N as an argument in a predetermined program block, which is one line of the program.

In case of the configuration in which the number of vibrations N is set as an argument in the program block of the machining program, the number of rotations S of the spindle 110, which is written in the machining program, and the number of vibrations N, which is called as an argument by executing the program block, are generally input to the presenting means 183.

In the example described above, the presenting means 183 (calculating section 183a) calculates the number of rotations and the number of vibrations on the basis of vibration frequencies f and the input number of rotations or the input number of vibrations. However, the present invention is not limited to this example. For example, the present invention can also be applied to the case where calculation is not involved. In such a case, the number of rotations and the number of vibrations are determined from a predetermined table. In addition, the selecting section 183c may display combination candidates on the displaying section 186, or may, for example, communicate the combination candidates to the user by voice.

Figure 5:
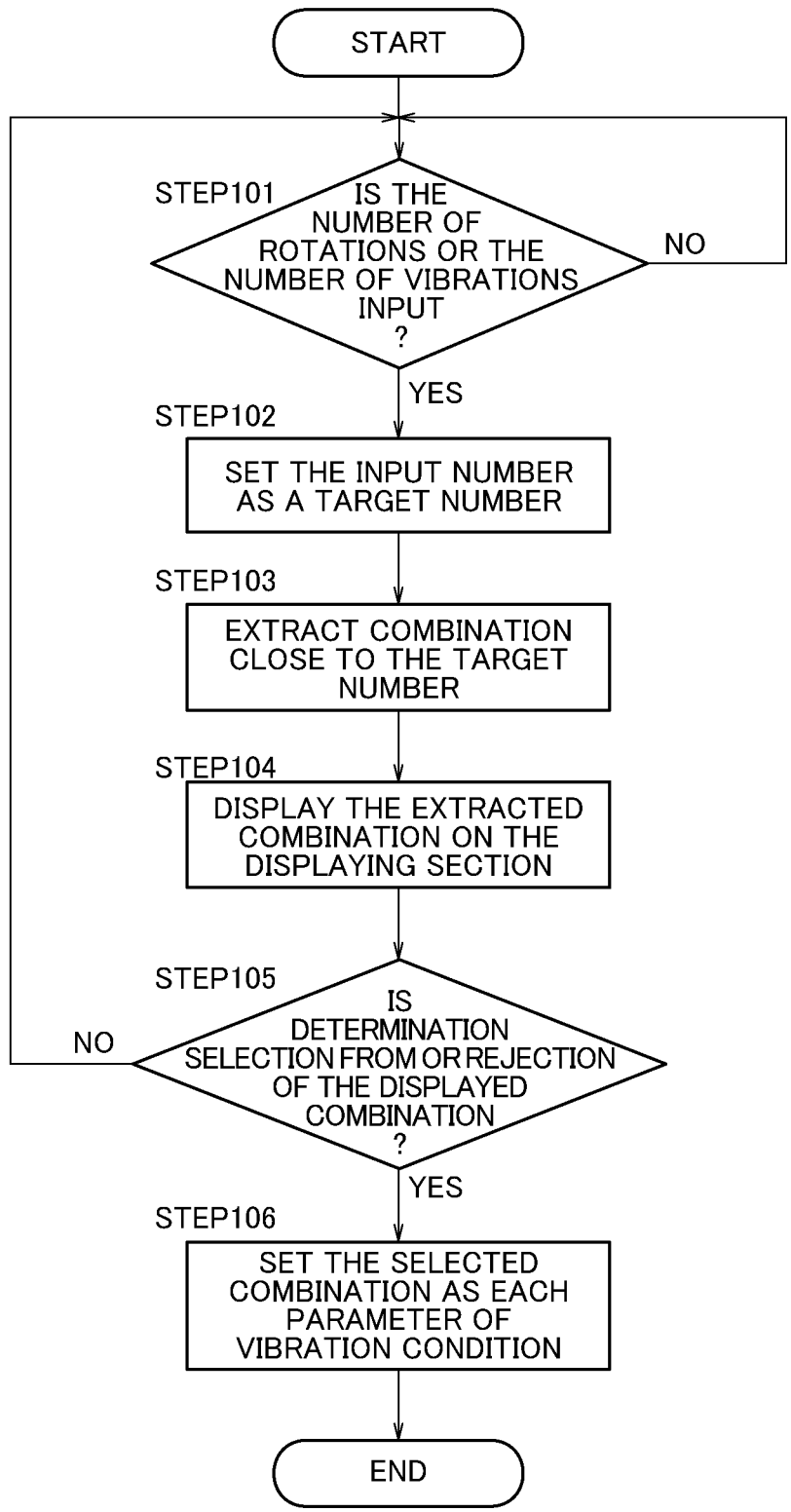
FIG. 5 is a flowchart for setting a vibration condition in the first embodiment of the present invention.

An example of a flowchart for setting vibration conditions by the control device 180 in the first embodiment is shown in FIG. 5.

In the first embodiment, the control device 180 is provided with a memory 185 storing the combination table in advance.

The presenting means 183 determines whether the number of rotations or the number of vibrations is input by the user via the inputting means 182 (STEP 101).

When the number of rotations or the number of vibrations is input (STEP 101: determination YES), the presenting means 183 sets the input number of rotations or the input number of vibrations as a target value for extracting a combination (STEP 102).

For example, when the number of rotations is input, the input number of rotations is set as the target number of rotations Su. When the number of vibrations is input, the input number of vibrations is set as the target number of vibrations Nu. Then, the set target number of rotations Su or the set target number of vibrations Nu is stored in the memory 185.

The presenting means 183 extracts combination candidates of vibration conditions close to the target number of rotations Su or the target number of vibrations Nu (STEP 103).

For example, when extracting combination candidates on the basis of the target number of rotations Su, the presenting means 183 compares the target number of rotations Su, which is stored in the memory 185 in STEP 101, with the number of rotations of each combination in the combination table. Then, combinations close to the target number Su are extracted as selection candidates.

Specifically, the presenting means 183 calculates the difference between the target number of rotations Su and the number of rotations of each combination, and extracts a combination as a selection candidate in ascending order of the difference.

Next, the presenting means 183 displays the extracted combinations as the selection candidates of the vibration condition, in which the machine tool 100 can operate, to the user via the displaying section 186 (STEP 104).

If there are a plurality of combination candidates to be presented, each combination candidate is displayed on the displaying section 186 so that one of the plurality of combination candidates can be selected as the vibration condition, and then, after the user selects, a determination button and a rejection button can be displayed on the displaying section 186 so that the selected combination can be determined or rejected as a vibration condition.

By executing the determination button, the selected combination can be configured to be set in the control section 181 as a parameter of the vibration condition including the vibration frequency f.

When displaying a plurality of combination candidates, for example, the combinations may be easily compared by sorting and displaying in order of approximation to the value of the target number of rotations Su or the target number of vibrations Nu.

If only one combination candidate is presented, a determination button and a rejection button can be displayed on the displaying section 186 as two options so that the presented combination can be determined or rejected as the vibration condition.

Next, it is determined whether the user's input is selection or rejection of combination (STEP 105).

The determination or rejection by the user may be configured to be input via the inputting means 182 other than the touch panel of the display or the like.

If the presented combination candidate is rejected (NO determination in STEP 105 of FIG. 5), the presenting means 183 is controlled so as to erase the display of the combination on the displaying section 186 and switch to a display for inputting a desired number of rotations or a desired number of vibrations so that the user can input via the inputting means 182.

If a combination is selected and determined from the presented combination candidates (determination YES in STEP 105), the setting means 184 sets the number of rotations of the determined combination as the number of rotations S, the number of vibrations as the number of vibrations N, and the vibration frequency as the vibration frequency f, and those parameters of vibration condition are set in the control section 181 (STEP 106).

Each set parameter can be stored in the memory 185 as a selection history of vibration conditions.

The control section 181 operates the spindle 110 and the cutting tool 130 with each parameter, which is set by the setting means 184 as a vibration condition, to perform vibration cutting to the workpiece W.

In this way, according to the desired number of rotations or the desired number of vibrations input by the user, a vibration condition can be selected from the combination candidates of vibration conditions in which the machine tool 100 can operate. Thus, the user can select a condition close to the desired vibration condition and recognize the vibration condition to perform vibration cutting to the workpiece W.

Figure 7A:
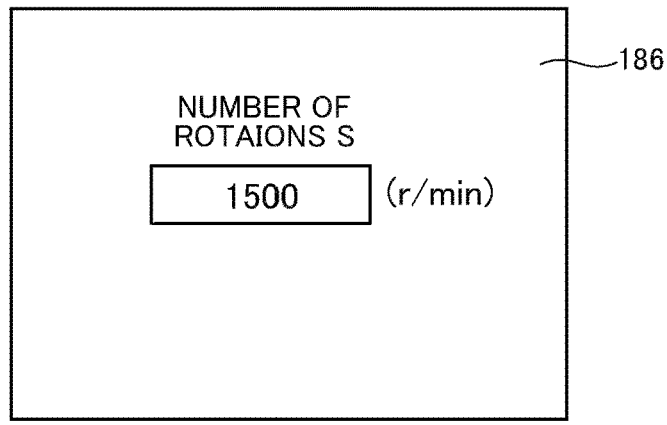
FIG. 7A is a diagram of a display for inputting a value of a desired number of rotations.

For example, for a machine tool having 25.0, 26.3, 27.8, . . . , 71.4, 83.3, and 100.0 (Hz) as the vibration frequency group f, if the selectable numbers of vibrations N are only 1.5, 2.5, 3.5, and 4.5, a correspondence table of the numbers of rotations shown in FIG. 6 is stored in the memory 185 as a combination table, and the combination table is used when extracting combination candidates. Those numbers of rotations in the combination table are calculated from each vibration frequency f of the vibration frequency group f and the selectable number of vibrations N, As shown in FIG. 7A, if the input window of the desired number of rotations is displayed on the displaying section 186 and the number of rotations=1500 (r/min) is input to the inputting means 182 by the user's inputting operation, the presenting means 183 sets the target number of rotations Su to 1,500.

Next, the presenting means 183 calculates the difference between the target number of rotations Su=1500 (r/min) and each number of rotations in the combination table, and the combination with a small difference, which is the combination close to the target number of rotations Su=1500, is extracted as a candidate for a combination of vibration conditions selectable by the user.

If three combinations are configured to be selected in order of approximation to the target number of rotations Su, 1500, 1538, and 1429 are selected in order of approximation to the input number of rotations, and according to each number of rotations, three combinations of S=1500, N=2.5, f=62.5, and S=1538, N=1.5, f=38.5, and S=1429, N=3.5, f=83.3 are extracted as selection candidates.

Figure 7B:
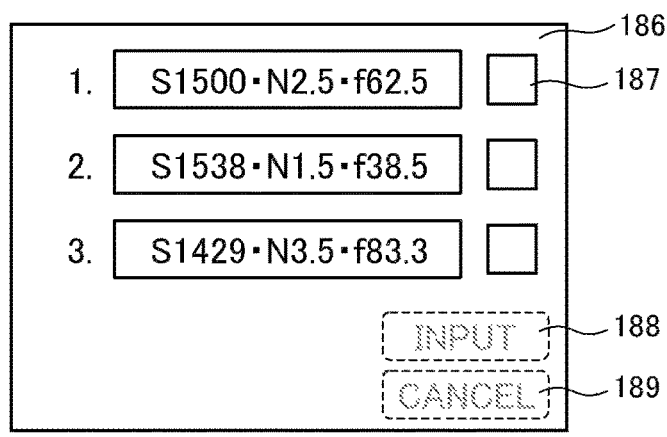
FIG. 7B is a diagram of a display for displaying extracted combinations.

Next, as shown in FIG. 7B, each combination candidate is presented on the displaying section 186 along with the selection button 187, the determination button 188, and the rejection button 189.

Figure 7C:
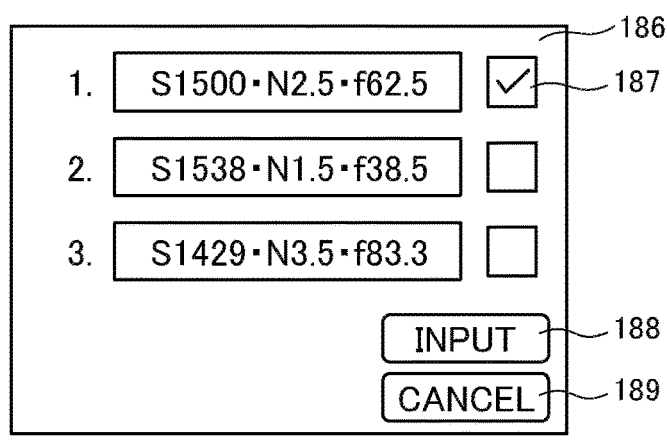
FIG. 7C is a diagram illustrating selection of a desired combination from displayed combinations.

For example, as shown in FIG. 7C, if the user selects the selection button 187 of the combination including the number of rotations S of 1500 (r/min) and selects the determination button 188, the setting means 184 sets the number of rotations S to 1500 (r/min), the number of vibrations N to 2.5 (times/r), and the vibration frequency f to 62.5 (Hz) to the control section 181.

The control section 181 controls the rotation of the spindle 110 and the reciprocal vibration of the cutting tool 130 on the basis of the set vibration conditions to perform vibration cutting to the workpiece W.

As described above, among the vibration conditions that can actually be set to the machine tool 100, the vibration conditions close to the desired number of rotations input by the user can be selected. Thus, the user can recognize the vibration conditions to be set and the desired vibration cutting can be performed.

In particular, by using a combination table in which the number of vibrations N is limited to a value obtained by adding 0.5 to an integer, the phase of the cutting trajectory generated on the peripheral surface of the workpiece is inverted by 180° for each rotation of the spindle 110. Thus, the user can select a vibration condition having a number of rotations close to the desired number of rotations, and cutting chips can be reliably segmented.

Second Embodiment

The second embodiment of the present invention applies another combination table of vibration conditions to the control device 180 in the first embodiment, and the other configuration is common with that in the first embodiment. Thus, the description of similar points is omitted.

Now, the second embodiment will be described in detail. In the second embodiment, when extracting the combination candidates of STEP 102 in the above-mentioned first embodiment, the setting means 184 sets the desired number of rotations input via the inputting means 182 as a target number of rotations Su, which is the fixed value. Then, the setting means 184 extracts a combination candidate to be selected on the basis of the number of vibrations that is calculated from the target number of rotations Su and each vibration frequency f.

For example, if the value of 1500 is input as the number of rotations via the inputting means 182 to the machine tool 100, in which the vibration frequency group f are 25.0, 26.3, 27.8, . . . , 71.4, 83.3, 100.0 (Hz), 1500 (r/min) is set as the target number of rotations Su.

Next, as shown in FIG. 8, the numbers of vibrations at the target number of rotations Su=1500 (r/min) are calculated for each vibration frequency f.

If the presenting means 183 is configured to extract a value close to a value obtained by adding 0.5 to an integer from the calculated number of vibrations, the differences between values below the decimal point of the calculated number of vibrations and the value obtained by adding 0.5 to an integer are compared. Then, a combination which has a smaller difference is extracted as a candidate of the vibration condition selectable by the user.

For example, in a case where three combination candidates to be presented are extracted in ascending order of differences between the value below the decimal point of the calculated number of vibrations and a value obtained by adding 0.5 to an integer, the presenting means 183 extracts 0.00, 0.04, and 0.07 in ascending order of differences, and sets S=1500, N=2.5, f=62.5, and S=1500, N=1.54, f=38.5, and S=1500, N=1.43, f=35.7 as combinations having smaller extracted difference values.

As a result, the desired number of rotations input by the user is fixed to the target number of rotations Su, and the vibration conditions desired by the user are set from the combination candidates extracted on the basis of the target number of rotations Su. Then, vibration cutting can be performed in the vibration condition that is set in this manner.

In addition, the value input by the user via the inputting means 182 may be numbers of vibrations, not numbers of rotations, and the input desired number of vibrations is fixed to the target number of vibrations Nu, and the number of rotations, which is calculated from the target number of vibrations Nu and each vibration frequency f in the vibration frequency group f, may be a combination candidate.

When presenting combination candidates, in addition to extracting candidates in descending order in number of rotations, it is also possible to extract three of the highest value, the intermediate value, and the lowest value of the vibration frequencies f as candidates.

Further, among the extracted combinations, it is possible to extract as candidates those numbers of rotations that are within a predetermined range.

Third Embodiment

The third embodiment of the present invention uses another flowchart for setting vibration conditions for the control device 180 in the first embodiment, and the other configuration is same as that in the first embodiment. Thus, the description about common matters is omitted.

Now, the third embodiment will be described in detail. In the third embodiment, the control section 180 described above includes an addition means that newly extracts a combination candidate different from the combination candidates presented on the displaying section 186 according to the user's instruction, and then extracts a new combination candidate to be presented on the displaying section 186.

For example, when displaying the combination candidate extracted by the presenting means 183 on the displaying section 186, the addition means displays an addition button for adding a different combination on the displaying section 186 and controls the inputting means 182 to determine whether the addition button is selected or not.

Figure 9:
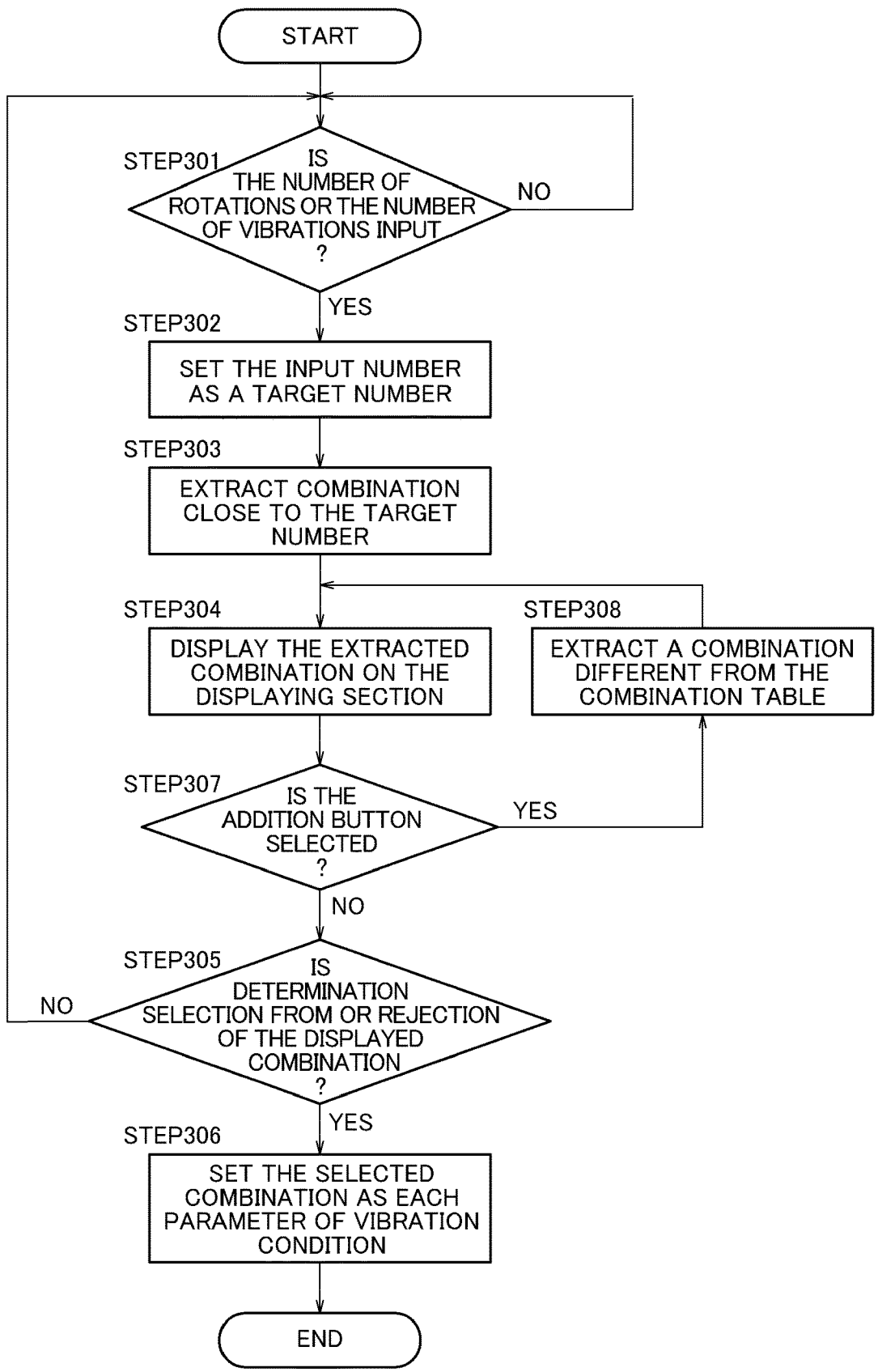
FIG. 9 is a flowchart for setting a vibration condition in the third embodiment of the present invention.

An example of a flowchart for setting vibration conditions in the third embodiment is shown in FIG. 9.

In FIG. 9, since STEPs 301 to 306 are the same processes as STEPs 101 to 106 in the first embodiment, the description will be omitted.

Figure 10:
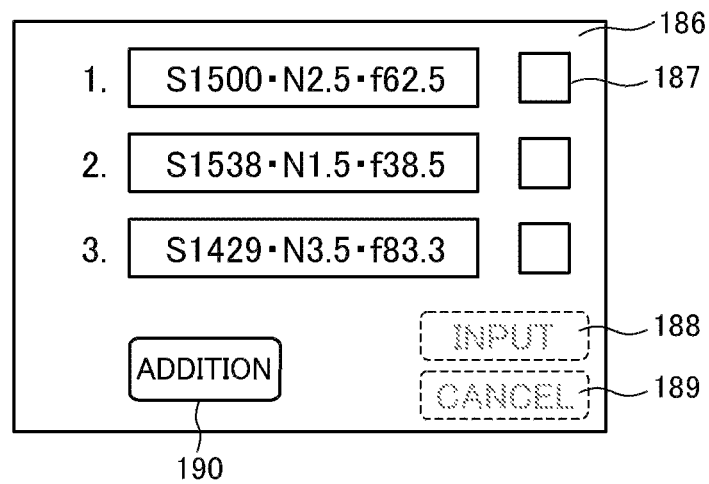
FIG. 10 is a diagram of a display for displaying extracted combinations.

When presenting combination candidates according to STEP 304, as shown in FIG. 10, an addition button 190 for adding a different combination candidate is presented, and it is checked whether the addition button 190 is selected or not (STEP 307 in FIG. 9).

If the addition button 190 is selected (determination YES), the presenting means 183 extracts a combination candidate different from the combination candidate already presented from the combination table (STEP 308).

Among the combinations close to the target number of rotations Su or the target number of vibrations Nu in the combination table extracted in STEP 303, as the combination candidate to be added, the combination, which is second closest to, in other words has the second smallest difference from the already presented combination is selected.

For example, if three combination candidates are configured to be presented in order of approximation, according to the number of times that the user selects the addition button, candidates are additionally presented in order of approximation such as in order of the fourth closest candidates, the fifth, the sixth, and the like.

The combination candidates extracted in STEP 308 are additionally displayed on the displaying section 186 in STEP 304.

Thus, by adding different combinations candidates, the user can have a wider selection of candidates and a higher degree of freedom for selecting vibration conditions.

Furthermore, the presenting means 183 may be configured to display candidates on the displaying section 186 or configured to input and output them by voice, or configured to be a combination of these configurations.

Fourth Embodiment

The fourth embodiment of the present invention applies another display content to the control device 180 in the first embodiment, and the other configuration is common with that in the first embodiment. Thus, the description of similar points is omitted.

Figure 11:
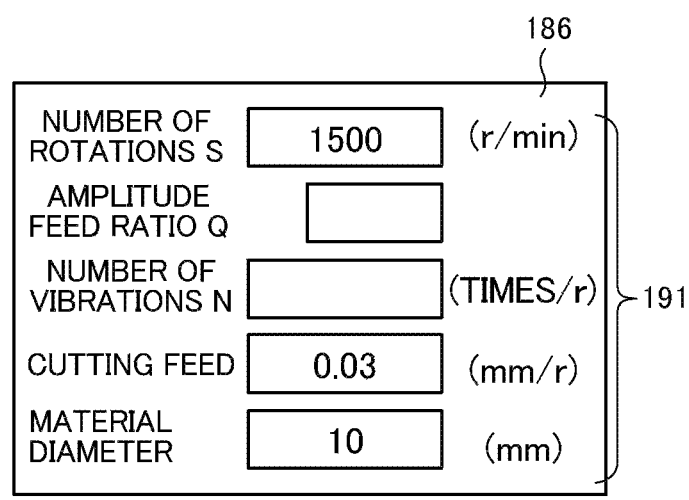
FIG. 11 is a diagram of a display for inputting a value of a desired number of rotation and the like in the fourth embodiment of the present invention.

Now, the fourth embodiment will be described in detail. In the fourth embodiment, as shown in FIG. 11, an input field 191 for a number of rotations S, an amplitude feed ratio Q, a number of vibrations N, a cutting feed, and a material diameter of the user's preferences is displayed on the displaying section 186. Thus, the user can input the number of rotations S, the amplitude feed ratio Q, the number of vibrations N, the cutting feed, and the material diameter. In the case of FIG. 11, the cutting feed=0.03 (mm/r) and the material diameter=10 (mm) are set and input. The cutting feed corresponds to the feed amount per rotation of the workpiece W. If the amplitude feed ratio Q and the number of vibrations N are not set in the input field 191, they can be set to predetermined default values. For example, the default value of the amplitude feed ratio Q can be 1.5, and the number of vibrations N selectable as the default value can be 1.5, 2.5, 3.5, and 4.5 (times/r). By setting and inputting the number of rotations S=1500 (r/min) in the input field 191, the presenting means 183 sets the target number of rotations Su to 1500.

If the presenting means 183 is configured to select three combinations to be presented in order of approximation to the target number of rotations Su, 1500, 1538, and 1429 are selected in order of approximation to the input number of rotations.

Figure 12:
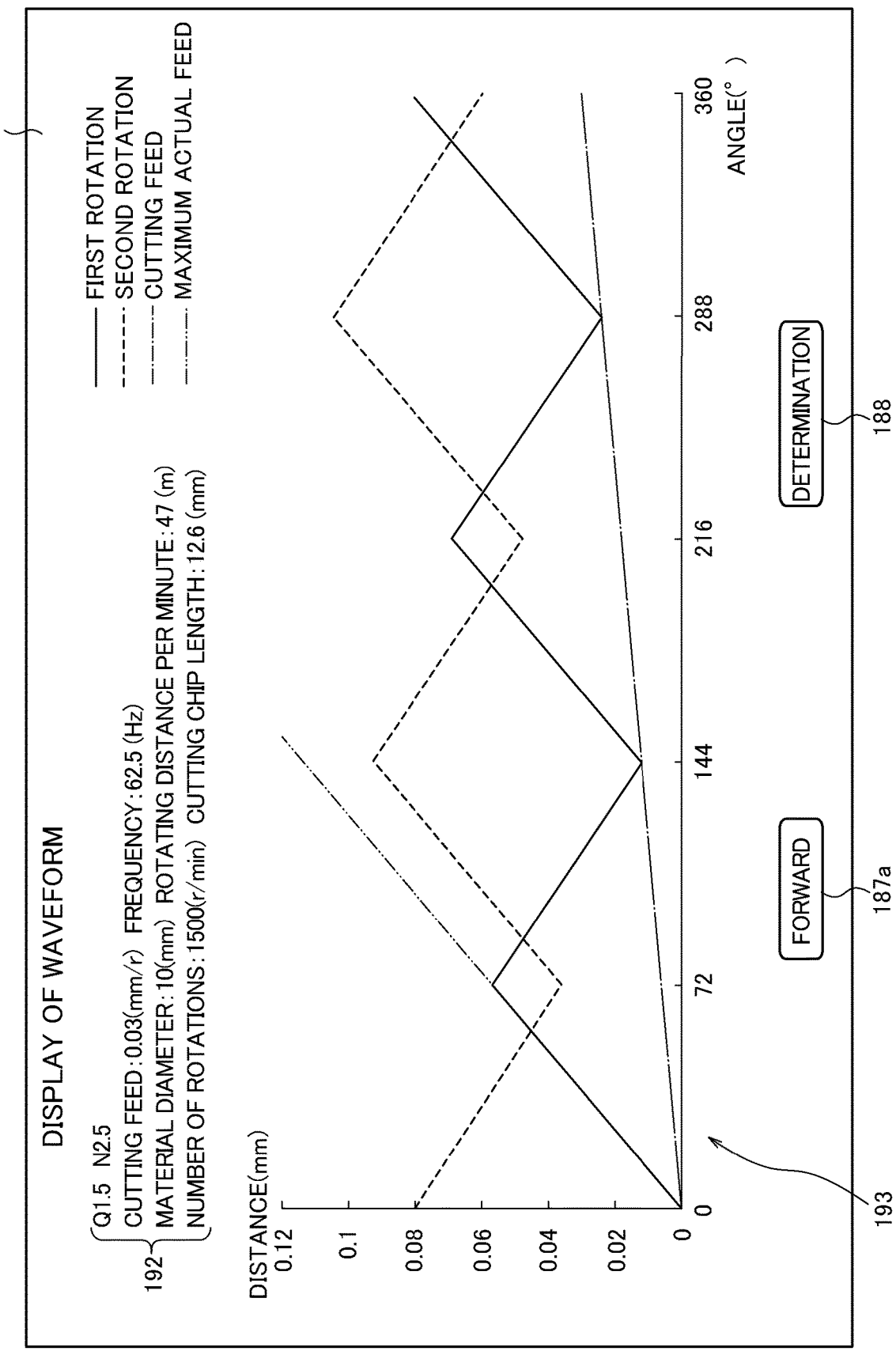
FIG. 12 is a diagram of a display for displaying an extracted combination.

As shown in FIG. 12, the first candidate having the number of rotations S=1500, the number of vibrations N=2.5, and the frequency f=62.5 is displayed on the display portion 186, on which a display field 192, a graph field 193, a forward button 187a, and a determination button 188 are shown. In the display field 192, a combination of each parameter such as the number of rotations, the number of vibrations, and frequency is shown.

In the graph field 193, a two-dimensional vibration operation, showing the position of the cutting tool and the phase of the spindle with vertical and horizontal axes respectively is graphically shown. The cutting trajectory of the cutting tool 130 in the first rotation of the spindle 110 is shown by a solid line, and the cutting trajectory of the cutting tool 130 in the second rotation of the spindle 110 is shown by a broken line. The one-dot chain line indicates the cutting feed, and the two-dot chain line indicates the maximum actual feed. The maximum actual feed is obtained from the set cutting feed, amplitude feed ratio Q and number of vibrations N, and the maximum actual feed is expressed by a straight line passing through the phase 0° of the spindle and the end point of the forward movement in other words, the start point of the backward movement of the cutting tool 130 at the first rotation of the spindle 110. It can be seen from this graph that the cutting tool 130 operates at a maximum actual feed that is larger than the set cutting feed (indicated by the one-dot chain line). Further, it can be understood from this graph that the air-cut occurs around 72°, 216°, and 360° of the phase of the spindle.

If the user selects the forward button 187a, the second candidate having the number of rotations S=1538, the number of vibrations N=1.5, and the frequency f=38.5 is displayed on the displaying section 186. Specifically, as shown in FIG. 13, a display filed 192, a graph field 193, a forward button 187a, a backward button 187b, and a determination button 188 are displayed on the displaying portion 186.

In the graph field 193, a two-dimensional vibration operation is graphically shown. Same as in FIG. 12, the cutting trajectory of the cutting tool 130 in the first rotation of the spindle 110 is shown by a solid line, and the cutting trajectory of the cutting tool 130 in the second rotation of the spindle 110 is shown by a broken line. It can be seen that air-cut occurs around 120° and 360° of the phases of the spindle.

If the user selects the backward button 187b, the displaying section 186 described in FIG. 12 is shown. On the other hand, if the user selects the forward button 187a on the displaying section 186 of FIG. 13, the third candidate having the number of rotations S=1429, the number of vibrations N=3.5, and the frequency f=83.3 is displayed on the displaying section 186. Specifically, as shown in FIG. 14, a display field 192, a graph field 193, a backward button 187b, and a determination button 188 are displayed on the display section 186.

In the graph field 193, a two-dimensional vibration operation is graphically shown, and same as in FIG. 12 and FIG. 13, the cutting trajectory of the cutting tool 130 in the first rotation of the spindle 110 is shown by a solid line, and the cutting trajectory of the cutting tool 130 in the second rotation of the spindle 110 is shown by a broken line. It can be seen from this graph that air-cut occurs around 51.4°, 154.2°, 257° and 360° of the phase of the spindle In a case where the user who has looked at the graphs in the order of FIG. 12, FIG. 13 and FIG. 14 decides, for example, to select the first candidate (S=1500, N=2.5, f=62.5), the backward button 187b is selected on the displaying section 186 of FIG. 14, then, the displaying section 186 of FIG. 13 is displayed. Further, the backward button 187b is selected in the displaying section 186 of FIG. 13, then the displaying section 186 of FIG. 12 is displayed.

Then, when the user selects the determination button 188 on the displaying section 186 of FIG. 12, the setting means 184 sets the number of rotations S=1500 (r/min), the number of vibrations N=2.5 (times/r), and the vibration frequency f=62.5 (Hz) for the control section 181.

Further, the addition means described in the third embodiment may be applied to the fourth embodiment so that a new combination candidate different from the three combination candidates shown in the displaying section 186 can be extracted.

REFERENCE SIGNS LIST 100 machine tool
110 spindle
110A spindle headstock
120 chuck (workpiece holding means)
130 cutting tool
130A cutting tool post
150 X-axis direction feeding mechanism
151 base
152 X-axis direction guide rail
153 X-axis direction feeding table
154 X-axis direction guide
155 linear servo motor
155a mover
155b stator
160 Z-axis direction feeding mechanism (feeding means, vibration means)
161 base
162 Z-axis direction guide rail
163 Z-axis direction feeding table
164 Z-axis direction guide
165 linear servo motor
165a mover
165b stator
180 control device
181 control section (cutting control means)
182 inputting means
183 presenting means
183a calculating section
183b extracting section
183c selecting section
184 setting means
185 memory
186 displaying section
187 selection button
187a forward button
187b backward button
188 determination button
189 rejection button
190 addition button
191 input field
192 display field
193 graph field
f vibration frequency
N number of vibrations
S number of rotations
W workpiece

The invention claimed is:

1. A control device for a machine tool provided in the machine tool comprising a cutting tool for cutting a workpiece, a rotator that relatively rotating the cutting tool and a workpiece, a feeder that feeds the cutting tool and a workpiece in a predetermined feed direction, and a vibrator that reciprocally vibrates the cutting tool and a workpiece in a relative manner by applying relative forward and backward movements to the cutting tool and the workpiece,
wherein the control device comprises;
a controller making the machine tool perform vibration cutting to a workpiece via the relative rotation of the cutting tool and a workpiece and via feeding of a cutting tool to the workpiece with reciprocal vibrations,
an input device for inputting a relative number of rotations or a relative number of vibrations of the cutting tool and a workpiece,
a selector selecting a combination of each parameter consisting of a number of rotations and a number of vibrations that are obtained on the basis of a vibration frequency dependent on a period, in which an operating instruction can be executed to the vibrator, and the number of rotations or the number of vibrations that is input via the input device, and
a setting device setting each parameter of the number of rotations and the number of vibrations in the controller on the basis of a predetermined combination selected from combinations that selected by the selector.

2. The control device for a machine tool according to claim 1, wherein the selector selectably displays a combination of each parameter consisting of the obtained number of rotations and the obtained number of vibrations.

3. The control device for a machine tool according to claim 2, wherein a combination of the each parameter and a graph that graphically shows a vibration operation corresponding to a combination of the each parameter are displayed.

4. The control device for a machine tool according to claim 3, wherein
the controller has a combination table including a plurality of combinations based on the vibration frequency, and
the selector selects a combination from the combination table that has a difference from a value input via the input device.

5. The control device for a machine tool according to claim 3, wherein
the controller has an adder that newly extracts a combination different from combinations selected by the selectors, and
the selector selects a different combination extracted by the adder.

6. A machine tool comprising the control device according to claim 3.

7. The control device for a machine tool according to claim 2, wherein
the controller has a combination table including a plurality of combinations based on the vibration frequency, and
the selector selects a combination from the combination table that has a difference from a value input via the input device.

8. The control device for a machine tool according to claim 2, wherein
the controller has an adder that newly extracts a combination different from combinations selected by the selectors, and
the selector selects a different combination extracted by the adder means.

9. A machine tool comprising the control device according to claim 2.

10. The control device for a machine tool according to claim 1, wherein
the controller has a combination table including a plurality of combinations based on the vibration frequency, and
the selector selects a combination from the combination table that has a difference from a value input via the input device.

11. The control device for a machine tool according to claim 10, wherein
the controller has an adder that newly extracts a combination different from combinations selected by the selector, and
the selector selects a different combination extracted by the adder.

12. A machine tool comprising the control device according to claim 10.

13. The control device for a machine tool according to claim 1, wherein
the controller has an adder that newly extracts a combination different from combinations selected by the selector, and
the selector selects a different combination extracted by the adder.

14. A machine tool comprising the control device according to claim 13.

15. A machine tool comprising the control device according to claim 1.

* * * * *